UNITED STATES PATENT OFFICE.

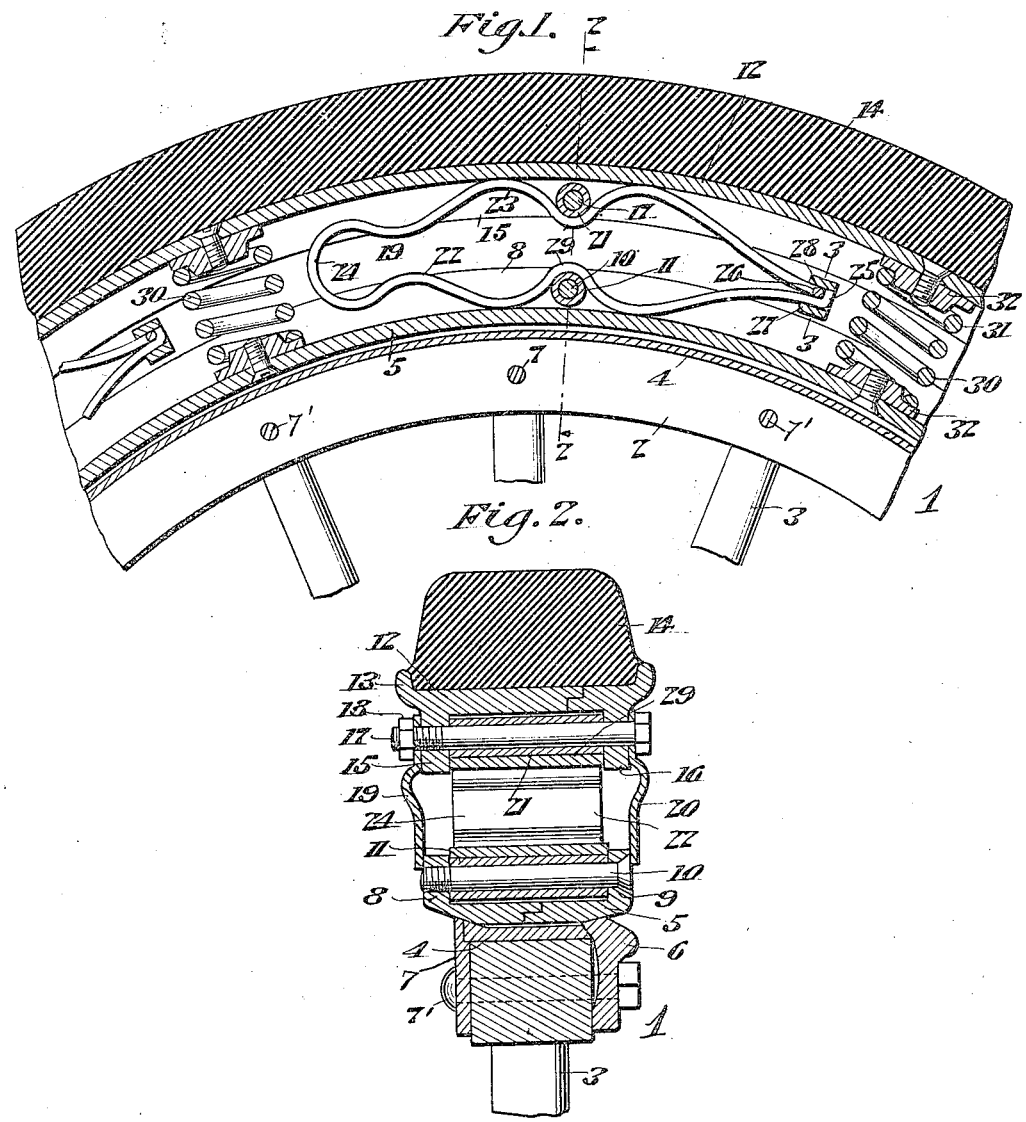

HERMANN DALWIGK, OF SAN ANTONIO, TEXAS, ASSIGNOR OF ONE-HALF TO HANNIBAL PIANTA, OF SAN ANTONIO, TEXAS.

AUTOMOBILE-TIRE.

1,252,246.  Specification of Letters Patent.  Patented Jan. 1, 1918.

Application filed July 24, 1917. Serial No. 182,467.

*To all whom it may concern:*

Be it known that I, HERMANN DALWIGK, a citizen of the United States, residing at San Antonio, in the county of Bexar and State of Texas, have invented new and useful Improvements in Automobile-Tires, of which the following is a specification.

This invention relates to a spring tire for vehicle wheels, and the object of the invention is to produce a device of this character which may be readily attached to any ordinary construction of vehicle wheels, which will provide a cushion for the said wheel.

Other objects and advantages will appear as the nature of the invention is more fully understood, reference being had to the accompanying drawings, in which, Figure 1 is an approximately fragmentary central vertical longitudinal view taken through the improvement as applied to a vehicle wheel.

Fig. 2 is a sectional view approximately on the line 2—2 of Fig. 1, and

Fig. 3 is a sectional view approximately on the line 3—3 of Fig. 1.

In the drawing, the numeral 1 designates a portion of an ordinary vehicle wheel, 3 one of the spokes therefor, 2 the felly and 4 the ordinary metallic band or rim, and it is here to be stated that the said band or rim 4 may be dispensed with if desired.

My improvement contemplates the employment of an inner fixed rim 5. The inner face of this rim 5, at the outer edges or corners thereof, is beveled or inclined, as illustrated in Fig. 2 of the drawings, and these beveled surfaces are contacted by the outer angular edges of flat ring members 6 and 7 arranged at the opposite sides of the felly 2 and secured to the said felly, as indicated by the characters 7'. The fixed rim section 5 is, upon its opposite sides, provided with annular flanges 8 and 9, the flange 9 being disposed in alinement with the flange 6, and the said flanges, at desired intervals are provided with alining openings, the openings in the flange 8 being threaded, and the outer face of the flange 9 being reamed at the openings provided therein, the said openings being designed to receive screw-bolts 10, the heads of the said bolts to be received in the referred to reamed portions and surrounding the openings of the flange 9 and the said threaded ends of the bolts engaging the threads in the openings of the flange 8. The numerals 11 designate sleeves, one being arranged upon each of the screw bolts 10 between the flanges 8 and 9 of the fixed rim 5, and the purpose of the foregoing construction and arrangement will presently be set forth.

The outer or tire carrying rim is indicated by the numeral 12, and is, of course, arranged concentric with and surrounds the fixed rim 5. The tire carrying rim 12 has its outer surface, upon the opposite edges thereof, preferably provided with flanges 13 to engage with the resilient or rubber tread member 14, and the said tread carrying rim is provided with inturned flanges 15 and 16 respectively, which are disposed in alinement with the annular flanges 8 and 9 of the fixed rim 5 and directed toward the said flange. The flanges 15 and 16 are provided, at spaced intervals with openings arranged in a line with the openings in the flanges 8 and 9, and the openings in the flange 15 may be threaded. Through the alining openings in the said flanges 15 and 16 is passed bolt members 17, the threads of the said bolt may be engaged with the threads in the openings of the flange 15, but the said threaded ends have also screwed thereon nuts 18. The nuts are designed to force an annular plate 19 against the outer surface of the flange 15, the plate being of the width sufficient to contact with the flange 8 of the fixed rim 5, and the head of the bolt 17 also engages with a similar plate 20 which is of a width sufficient to overlie the outer surface of the flange 9 of the fixed rim 5. The plates 19 and 20 are designed to protect the inner or channeled surface of the fixed and tire carrying rims. Surrounding the portion of the bolt 17 arranged between the flanges 15 and 16 is a sleeve 21.

The rims may, of course, be constructed of split members and also the said rims may be formed of sections, if desired, in either event, the ends of the same are suitably connected, and in order to retain the said rims in a proper spaced relation with each other and also to force the desired resiliency to the tire, I provide suitable spring means which will now be explained in detail.

The spring spacing means between the fixed and tire carrying rims is in the nature of hair-pin springs 22, the longitudinal arms 23—23 of which being rounded outwardly from their ends, one of their ends being rounded upon itself as at 24 to its connection with the arms 23—23, while the opposite end, in the device illustrated by the drawing, is formed by upsetting the extremity of one of the arms 23 as indicated by the numeral 25 and providing the extremity of the second arm or limb 23 with a transverse rounded depression 26. The extremities 25 and 26 of the limbs or arms 23 are received between the suitable plates 27, and the numeral 28 designates the connecting element for the plate which may be in the nature of a bolt or rivet which passes between the upset portion 25 of one of the limbs 23 and the depression extremity 26 of the other limb of the spring. It, of course, is to be understood that the springs 22 may be connected as a single element, but in any event, the ends of the said spring are of a size to be at all times spaced away from the inner surfaces of the fixed and of the tire carrying rims. The outwardly bulged or rounded limbs 23 of the spring 22 are centrally incurved as at 29, whereby to receive therein the respective sleeves 11 and 21 carried by the bolts 10 and 17. The out bulged portions of the limbs 23 of the spring 22, opposite the referred to incurved or rounded portions 29 contact with the inner surface of the respective rims 5 and 12, and the spring 22 is of a width sufficient to be snugly received in the channels or between the flanges of the fixed rim 5 and the tire carrying rim 12.

If desired, and as illustrated in Fig. 1 of the drawings, I may arrange between each of the hair-pin springs 22, a helical spring 30 having their opposite ends engaged by lugs 31 provided upon blocks 32 which are arranged diametrically opposite each other and secured to the respective rims 5 and 12, and from the foregoing description, it will be seen that the engagement of the limbs 23 of the spring 22 with the sleeves 11 and 21 will not only cause the said limbs to be rounded inwardly toward each other as at 29, but by virtue of contact with the walls provided by the said rounded or bulged portions of the spring with the said sleeves, will hold the spring 22 against longitudinal movement, while, as stated, the width of the spring being equal to the distance between the flanges of the respective rims will prevent a lateral movement of the said spring.

It is to be understood that the tire carrying rim may be made in two sections to facilitate the placing of the springs and a solid rubber tire, if the latter is used. If such construction of tire is not used, and the steel rim is retained, the rim may be cast solid.

Having thus described the invention, what I claim is:

1. In a spring wheel, a fixed rim and a tire carrying rim surrounding the fixed rim, a plurality of hair-pin springs arranged between and contacting with the rims, the longitudinal limbs of said springs being centrally rounded inwardly, and elements carried by the respective rims engaging in the said rounded portions of the springs.

2. In a spring tire for wheels, a flanged fixed rim and a flanged tire carrying rim surrounding the fixed rim, a plurality of hair-pin springs resting between the flanges of the rims, each of said hair-pin springs having its longitudinal limbs rounded outwardly from the ends thereof whereby to contact with the inner surface of the respective rims, and means, comprising elements passing transversely through the flanges of the respective rims and engaging centrally with the referred to limbs of the springs whereby to centrally depress the said limbs and to retain the springs against longitudinal movement with respect to the rims.

3. In a spring wheel, a fixed flanged rim and a flanged tire carrying rim surrounding the fixed rim, oppositely disposed bolt members passing through the flanges of the respective rims, sleeves surrounding the bolts between the rims, a plurality of hair-pin springs between the rims and of a width to contact with the flanges of the rim, the longitudinal limbs of each of said springs contacting with the inner surface of the respective rims, and the said longitudinal limbs centrally engaging with the sleeves of the respective bolts, whereby to depress the said central portions of the limbs and to retain the springs against longitudinal movement with respect to the tire.

In testimony whereof I affix my signature.

HERMANN DALWIGK.

Copies of this patent may be obtained for five cents each, by addressing the "Commissioner of Patents, Washington, D. C."